United States Patent [19]
Inamura

[11] Patent Number: 5,551,702
[45] Date of Patent: Sep. 3, 1996

[54] METAL LAMINATE GASKET WITH ENGAGING DEVICE

[75] Inventor: Susumu Inamura, Tokyo, Japan

[73] Assignee: Ishikawa Gasket Co., Ltd., Tokyo, Japan

[21] Appl. No.: 270,651

[22] Filed: Jul. 5, 1994

[51] Int. Cl.⁶ ........................................... F16J 15/08
[52] U.S. Cl. ........................................ 277/11; 277/235 B
[58] Field of Search .................... 277/9–11, 235 B

[56] References Cited

U.S. PATENT DOCUMENTS

| | | | |
|---|---|---|---|
| 4,648,607 | 3/1987 | Yamanda et al. | 277/235 B |
| 4,776,601 | 10/1988 | Yamada | 277/235 B |
| 5,083,801 | 1/1992 | Okano et al. | 277/11 |
| 5,095,867 | 3/1992 | Inamura | 277/235 B |
| 5,096,325 | 3/1992 | Udagawa | 277/235 B |
| 5,154,529 | 10/1992 | Udagawa et al. | 277/235 B |
| 5,259,629 | 11/1993 | Udagawa | 277/235 B |
| 5,375,851 | 12/1994 | Mockenhaupt. | |

FOREIGN PATENT DOCUMENTS 0500282  8/1992  European Pat. Off. .

*Primary Examiner*—Scott W. Cummings
*Attorney, Agent, or Firm*—Kanesaka & Takeuchi

[57] ABSTRACT

A metal laminate gasket of the invention is engaged with an engaging projection of an engine part for immovably locating the gasket on the engine part. The gasket is basically formed of first and second metal plates laminating together. The first plate includes at least one first hole and at least one engaging portion extending into the first hole. The second plate is situated above the first plate, and includes at least one second hole larger than the diameter of the engaging projection and at least one restricting portion. When the gasket is urged against the engine part, the engaging portion deforms and engages the engaging projection, while the restricting portion restricts bending strength of the engaging portion. The gasket is not accidentally disengaged from the engaging projection.

7 Claims, 2 Drawing Sheets

METAL LAMINATE GASKET WITH ENGAGING DEVICE

BACKGROUND OF THE INVENTION AND RELATED ART STATEMENT

The present invention relates to a metal laminate gasket for an internal combustion engine with an engaging device, such as a cylinder head gasket and a manifold gasket, which can be securely attached to dowels or bolts on an engine part.

When a cylinder head and a cylinder block are assembled together, the cylinder block is placed on a floor or a platform, and a gasket is placed on the cylinder block so that dowels formed on the cylinder block are located in dowel holes of the gasket. Then, the cylinder head is placed above the gasket, and the cylinder head and the cylinder block are tightened together by bolts.

In order to easily assemble the gasket on the cylinder block, the diameter or size of the dowel hole of the gasket is made slightly larger than the diameter of the dowel. Therefore, in case the cylinder block with the gasket thereon is shaken, the gasket may disengage from the cylinder block.

Especially, in a V-type engine, gasket attaching surfaces of the cylinder block incline downwardly. Therefore, even if the gaskets are installed on the gasket attaching surfaces of the cylinder block, the gaskets may disengage from the cylinder block.

Similarly, in case a manifold gasket is installed in the cylinder head having bolts for fixing a manifold to the cylinder head, the manifold gasket is placed on the cylinder head such that the bolts engage bolt holes of the manifold gasket. When the cylinder head with the manifold gasket thereon is shaken, the manifold gasket may disengage from the bolts.

In an automatic assembly line for engines, the engines are continuously or consecutively moved. In some cases, the engine parts are stopped for a while for assembly, and then moved. In the automatic assembly line, it is troublesome to check the gasket in each engine, and to install a gasket in case no gasket is placed on the engine part.

In order to solve the above problems, there had been proposed U.S. Pat. Nos. 5,083,801, 5,095,867, 5,096,325, 5,154,529 and 5,259,629.

In U.S. Pat. Nos. 5,095,867, 5,096,325 and 5,154,529, it is required to use specific dowel pins. In U.S. Pat. Nos. 5,083,801 and 5,259,629, although no specific dowel pins are required, if the gasket is shaken strongly, the gasket may still disengage from the dowel pins or bolts.

Accordingly, one object of the present invention is to provide a metal laminate gasket having an engaging device to prevent the gasket from accidentally disengaging from the engine part even if the gasket is strongly shaken while the strength of the engaging device can be regulated easily.

Another object of the invention is to provide a metal laminate gasket as stated above, which can be easily installed on the engine without affecting sealing ability of the gasket.

A further object of the invention is to provide a metal laminate gasket as stated above, which can be easily and economically manufactured.

Further objects and advantages of the invention will be apparent from the following description of the invention.

SUMMARY OF THE INVENTION

In accordance with the invention, a metal laminate gasket is designed to be easily and firmly engaged with an engaging projection, such as a dowel pin and a bolt, of an engine part. The gasket can be properly positioned and immovably placed on the engine part while the engaging strength of the gasket relative to the engaging projection is regulated. The gasket is not accidentally disengaged or does fall from the engine part.

The gasket is basically formed of first and second metal plates piled and connected together. The first plate includes at least one first hole for receiving therein the engaging projection, and at least one first engaging portion formed at a part around the first hole and projecting into the first hole.

The second plate is situated above the first plate, and includes at least one second hole corresponding to and located above the first hole, and at least one restricting portion. The restricting portion is formed at a part around the second hole and situated above a part of the first engaging portion. When the first engaging portion engages the engaging projection by urging the first and second plates to the engaging projection, the restricting portion regulates and restricts the bending strength of the first engaging portion. Thus, the gasket does not easily disengage from the engaging projection.

Preferably, a plurality of the first engaging portions is situated around the first hole, wherein the first engaging portion is sandwiched between two first non-engaging portions. The first engaging portions and first non-engaging portions define the first hole. In this case, the second plate includes a plurality of the restricting portions situated above parts of the first engaging portions.

The second hole may be a circular hole. When the first and second plates are piled together, the first engaging portions are located inside the second hole.

On the other hand, the second plate may include a plurality of deep portions for defining the restricting portions therebetween. The restricting portion defined by the deep portions is curved in a direction opposite to a curvature of the engaging projection and projects as in the first engaging portion. Accordingly, the first engaging portion can easily bend together with the restricting portion.

Also, the second plate may include a plurality of deep portions and a plurality of second engaging portions alternately arranged to each other. When the first and second engaging portions are assembled, the first engaging portions are located under the deep portions. When the first engaging portions are bent, the first engaging portions are located in notches of the deep portions while the bending strength is restricted by the deep portion. The second engaging portions engage the engaging projection, as well.

In case two engaging projections situated away from each other are formed on the engine part, the gasket can be placed in a proper position on the engine part. The position of the gasket is set by the engaging projections.

The first and second plates may be connected together in a conventional method, such as welding or grommet partly covering the first and second plates. In the gasket of the invention, one or more plate may be installed under the first plate, or above the second plate to form a metal laminate gasket with three or more plates.

DETAILED DESCRIPTION OF PREFERRED EMBODIMENTS

Figure 1:
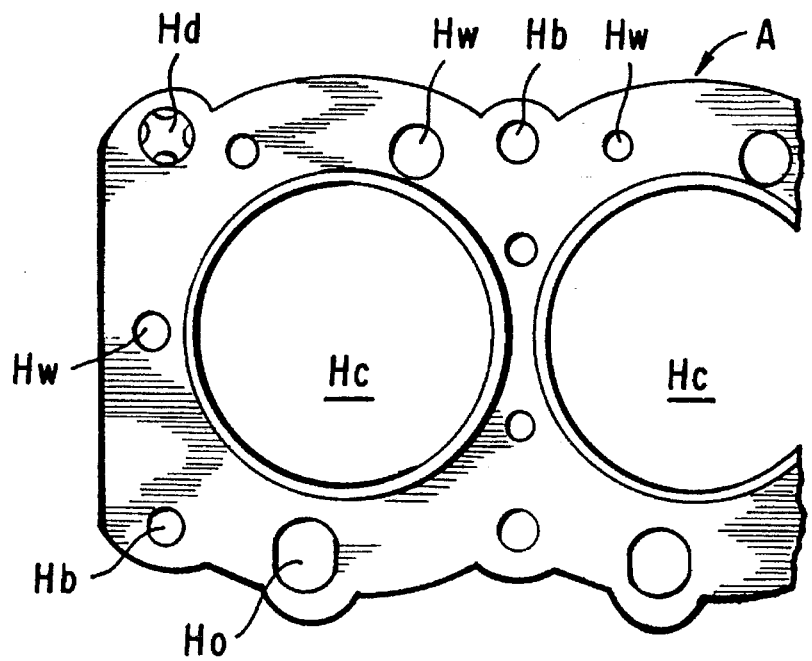
FIG. 1 is a plan view of a part of a first embodiment of a cylinder head gasket of the invention.
Figure 2:
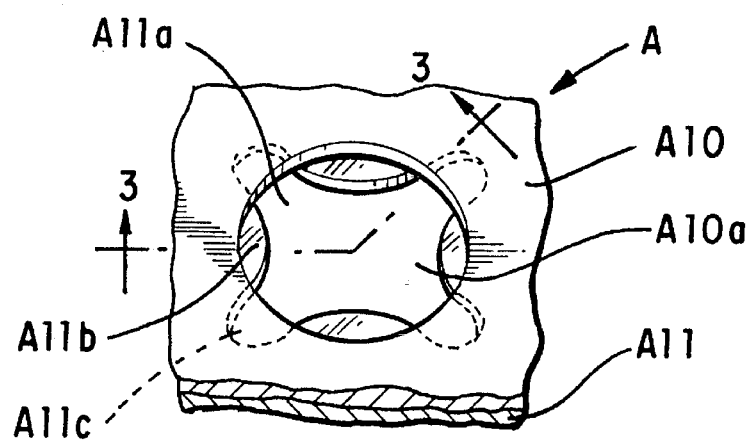
FIG. 2 is an enlarged perspective view of a dowel hole of the gasket of the invention.
Figure 3:
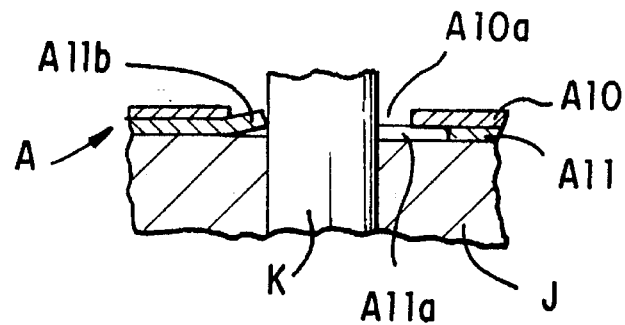
FIG. 3 is a section view taken along a line 3—3 in FIG. 2 for showing the gasket installed on a cylinder block.

Referring to FIGS. 1–3, a first embodiment A of a metal laminate gasket of the invention is shown. The gasket A is a cylinder head gasket and is provided with a plurality of cylinder bores Hc, water holes Hw, oil holes Ho, bolt holes Hb, and positioning or dowel holes Hd, as in the conventional gasket. Since the present invention is directed to the structure of the dowel holes Hd, other structure and sealing mechanisms are not explained. Any structure and sealing mechanisms may be used.

As shown in FIG. 3, the gasket A of the invention is designed to be installed on a cylinder block J with a dowel K. The dowel K has a cylindrical form and slightly projects upwardly from an upper surface of the cylinder block J. A bolt (not shown) passes through a hole of the dowel K to connect a cylinder head (not shown) to the cylinder block J.

The gasket A comprises an upper plate A10 and a lower plate A11, which extend substantially throughout the entire area of the engine. The upper plate A10 includes a hole A10a having a diameter slightly larger than the diameter of the dowel K. Parts of the upper plate A10 around the hole A10a constitute restricting portions.

The lower plate A11 is situated under the upper plate A10 and includes a hole A11a defined by four engaging or projecting portions A11b and four non-engaging or recessed portions A11c. The distance between the projecting portions A11b facing against each other is smaller than the diameter of the dowel K. The distance between the recessed portions A11c facing against each other is greater than the diameter of the dowel K. Namely, the projecting portions A11b project into a hole for the dowel K to engage therewith.

When the plates A10, A11 are assembled, the plates A10, A11 are connected together by spot welding (not shown). In case a grommet or a cover member for holding the upper and lower plates is used, the plates need not be connected together by the spot welding.

When the gasket A is installed on the cylinder block the gasket A is placed above the cylinder block J so that the dowel K aligns the dowel hole Hd formed of the holes A10a, A11a. Then, the gasket A is strongly pushed against the cylinder block J. As a result, the projecting portions A11b are bent upwardly to allow the dowel K to enter into the hole Hd while parts of the upper plate A10, i.e. restricting portions, located above the projecting portions A11b operate to prevent movement of the projecting portions A11b.

Since the hole A10a of the upper plate A10 is larger than the diameter of the dowel K, when the engaging portions A11b are bent, the engaging portions A11b are urged to partly locate inside the hole A10a. The projecting portions A11b do not project beyond the upper surface of the upper plate A10.

In the gasket A, in case the diameter of the hole A10a is changed, the bending strength of the engaging portions A11b can be regulated. Namely, in case the diameter of the hole A10a is made large, the engaging portions A11b can be bent easily. On the other hand, in case the diameter of the hole A10a is made small, the engaging portions A11b must be bent steep, so that a large force is required to install the gasket to the cylinder block.

The diameter of the hole A10a is determined based on the thickness of the plate A11. Generally, as the thickness of the plate A11 becomes thicker, the diameter of the hole A10a becomes greater.

In the gasket A, since the hole A10a is a circular hole curved in the same direction as in the outer surface of the dowel K, when the engaging projection A11b is bent along the edge of the hole A10a, a relatively large force is applied to the edge of the hole A10a intersecting the edge of the engaging projection A11b. Namely, the upper plate A10 acts to relatively strongly prevent the engaging projection A11b from bending upwardly.

Generally, two dowels are formed on the cylinder block J. When the dowels K enter into the dowel holes Hd, the gasket A does not move and is properly positioned on the cylinder block J.

Figure 4:
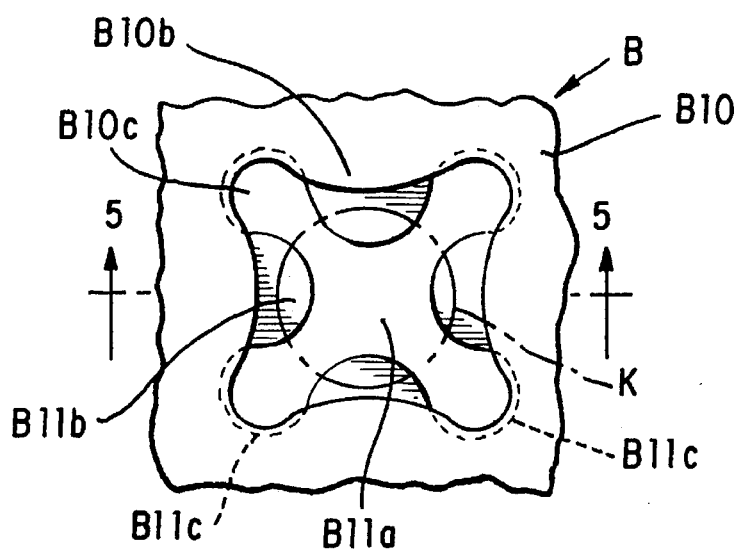
FIG. 4 is an enlarged plan view of a part of a second embodiment of the invention.
Figure 5:
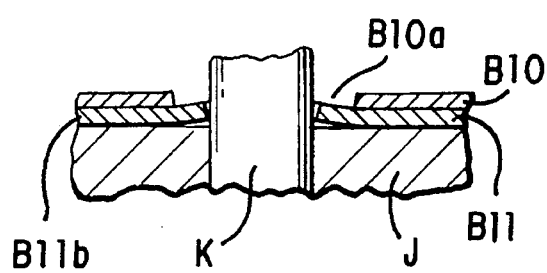
FIG. 5 is a section view taken along a line 5—5 in FIG. 4 for showing the gasket installed on the cylinder block.

FIGS. 4 and 5 show a second embodiment B of the gasket of the invention. The gasket B is a cylinder head gasket and is formed of an upper plate B10 with a hole B10a, and a lower plate B11 with a hole B11a, similar to the gasket A.

The hole B10a of the upper plate B10 is defined by four restricting portions B10b and four recessed portions B10c. The restricting portion B10b is curved in the direction opposite to the curvature of the dowel K. The distance between the restricting portions B10b facing against each other is greater than the diameter of the dowel K.

The lower plate B11 is situated under the upper plate B10, and the hole B11a is defined by four engaging portions B11b and four recessed portions B11c, similar to the upper plate B10. However, the engaging portion B11b forms a flap. The distance between the engaging portions B11b facing against each other is smaller than the diameter of the dowel K, while the distance between the recessed portions B11c facing against each other is greater than the diameter of the dowel K.

When the gasket B is assembled, the engaging portions B11b is located under the restricting portions B10b. When the gasket B is placed over the cylinder block J and is pushed over the dowel K, the engaging portions B11b are slightly bent upwardly, and are located in the hole B10a. The engaging portions B11b engage the dowel K.

In the gasket B, since the restricting portions B10b are curved in the direction opposite to the curvature of the dowel K and extend over the entire length or width of the engaging portions B11b, the restricting portions B10b can be bent relatively easily in comparing with the gasket A. In the gasket B, the bending strength of the engaging portion B11b is adjusted by changing the distance of the restricting portion B10b relative to the dowel K.

The gasket B does not accidentally disengage from the cylinder block J and operates as in the gasket A.

Figure 6:
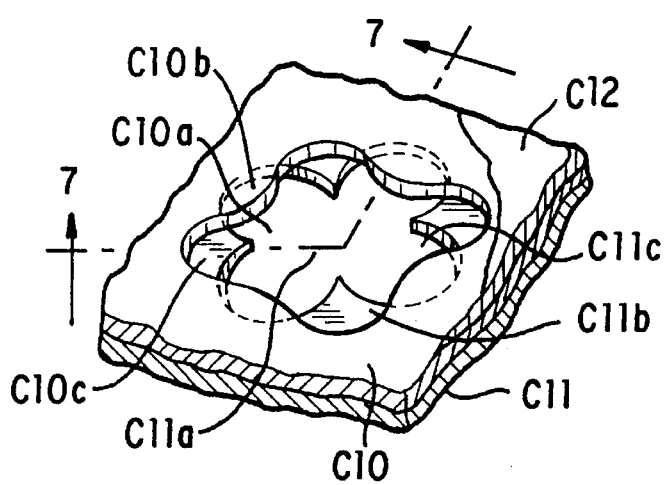
FIG. 6 is an enlarged perspective view of a part of a third embodiment of the invention.
Figure 7:
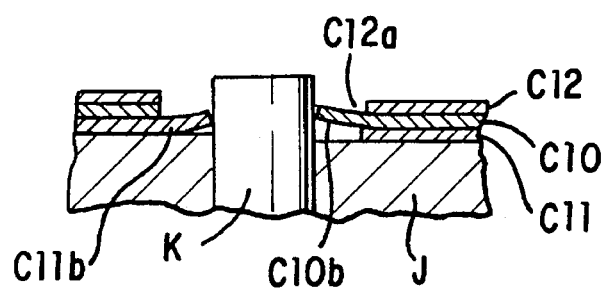
FIG. 7 is a section view taken along a line 7—7 in FIG. 6 for showing the gasket installed on the cylinder block.

FIGS. 6 an 7 show the third embodiment C of the invention. The gasket C is a cylinder head gasket and is formed of an upper plate C12, a middle plate C10, and a lower plate C11. The upper plate C12 includes a hole C12a larger than the diameter of the dowel K.

The middle plate C10 includes a hole C10a defined by four restricting portions C10b and four recessed portions C10c. The distance between the restricting portions facing against each other is substantially the same as the diameter of the dowel K.

The lower plate C11 is situated under the middle plate C10 and includes a hole C11a defined by four engaging portions C11b and four recessed portions C11c. The distance between the engaging portions C11b facing against each other is smaller than the diameter of the dowel K, while the distance between the recessed portions C11c facing against each other is greater than the diameter of the dowel K. Namely, the engaging portions C11b project into a hole for the dowel K.

The middle and lower plates C10, C11 are arranged such that the engaging portions C11b of the lower plate C11 are located under the recessed portions C10c of the middle plate C10. The movement of the engaging portion C11b is restricted by the side edges of the restricting portion C10b. In the gasket C, the distance between the restricting portions facing each other is substantially the same as the diameter of the dowel, but the distance may be changed, such as smaller than the diameter of the dowel to engage the dowel K. The engaging projections may be different in length, thickness, size or shape.

When the gasket C is pushed over the dowel K, the engaging portions C11b are slightly bent upwardly to be located in the hole C10a and engage the dowel K. In the gasket C, when the size of the restricting portions C10b is adjusted, the bending strength of the engaging portions C11b can be adjusted.

In the metal laminate gasket of the present invention, the lower plate includes the engaging portion, and the upper plate includes the restricting portion for the engaging portion. When the gasket is pushed over the engaging projection, i.e. dowel or bolt, the engaging portion is bent to securely engage the gasket to the engine part while the restricting portion regulates bending strength of the engaging portion. Since the engaging portion securely engages the dowel or bolt, even if the engine part is transferred in an assembly line, the gasket does not accidentally disengage from the engine part.

While the invention has been explained with reference to the specific embodiments of the invention, the explanation is illustrative, and the invention is limited only by the appended claims.

What is claimed is:

1. A metal laminate gasket adapted to be engaged with an engaging projection of an engine part for immovably locating the gasket on the engine part, comprising, a first plate including at least one first hole for receiving therein the engaging projection of the engine part, a plurality of first engaging portions and a plurality of first non-engaging portions alternately arranged together, said engaging projection having a size greater than a space surrounded by the first engaging portions and smaller than a space surrounded by the first non-engaging portions, said first engaging and non-engaging portions defining the first hole, and a second plate situated above the first plate, said second plate including at least one second hole located above the first hole, and a plurality of restricting portions formed along the second hole and situated above the first engaging portions and first non-engaging portions, said restricting portions regulating and restricting bending strength of the first engaging portions located under the restricting portions when the first engaging portions engage the engaging projection by urging the first and second plates to the engaging projection to allow the engaging projection to enter into the first and second holes so that the gasket does not easily disengage from the engaging projection.

2. A metal laminate gasket according to claim 1, wherein said second hole is a circular hole, said first engaging portions being located in the second hole when the first and second plates are piled together.

3. A metal laminate gasket according to claim 1, wherein said second plate includes a plurality of deep portions and a plurality of second engaging portions alternately arranged together, said second engaging portions engaging the engaging projection, said first engaging portions being located under the deep portions so that when the first engaging portions are bent, the first engaging portions are located in the deep portions while the bending strength is restricted by the deep portion.

4. A metal laminate gasket according to claim 3, wherein said first and second engaging portions are different in length.

5. A metal laminate gasket according to claim 3, wherein said first and second engaging portions are different in shape.

6. A metal laminate gasket according to claim 1, wherein said second hole has a size greater than that of the engaging projection, said restricting portions being disposed above edges of the first engaging portions to thereby restrict movement of the first engaging portions.

7. A metal laminate gasket adapted to be engaged with an engaging projection of an engine part for immovably locating the gasket on the engine part, comprising, a first plate including at least one first hole for receiving therein the engaging projection of the engine part, a plurality of first engaging portions and a plurality of first non-engaging portions alternately arranged together, said engaging projection having a size greater than a space surrounded by the first engaging portions and smaller than a space surrounded by the first non-engaging portions, said first engaging and non-engaging portions defining the first hole, and a second plate situated above the first plate, said second plate including at least one second hole located above the first hole, a plurality of restricting portions formed along the second hole and situated above the first engaging portions, a curvature of the restricting portion being greater than that of the first engaging portion, and a plurality of deep portions situated at both sides of the respective restricting portions, each restricting portion sandwiched between the deep portions being curved in a direction opposite to a curvature of the engaging projection directly facing thereto, said restricting portions regulating and restricting bending strength of the first engaging portions when the first engaging portions engage the engaging projection by urging the first and second plates to the engaging projection to allow the engaging projection to enter into the first and second holes so that the gasket does not easily disengage from the engaging projection, said restricting portions projecting along and at least partially overlapping the first engaging portions to thereby allow the first engaging portions to easily bend together with the restriction portions.

* * * * *